United States Patent
Preis et al.

(10) Patent No.: US 6,931,841 B2
(45) Date of Patent: Aug. 23, 2005

(54) PROCESS FOR THE CATALYTIC EXHAUST GAS AFTERTREATMENT OF ENGINE COMBUSTION EMISSIONS

(75) Inventors: Michael Preis, Koenigsbrunn (DE); Hans Fickel, Moosburg (DE); Juergen Ringler, Kissing (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 10/318,402

(22) Filed: Dec. 13, 2002

(65) Prior Publication Data

US 2003/0115857 A1 Jun. 26, 2003

(30) Foreign Application Priority Data

Dec. 15, 2001 (DE) ......................... 101 61 696

(51) Int. Cl.[7] ............................................. F01N 3/00
(52) U.S. Cl. ..................... 60/286; 60/295; 60/301; 60/303; 60/309
(58) Field of Search .................. 60/286, 295, 301, 60/303, 309, 275; 123/1 A, DIG. 12

(56) References Cited

U.S. PATENT DOCUMENTS

| | | | |
|---|---|---|---|
| 3,779,014 A | * 12/1973 | Nohira et al. ............ | 60/286 |
| 4,059,076 A | 11/1977 | Kosaka et al. | |
| 5,272,871 A | * 12/1993 | Oshima et al. ........... | 60/274 |
| 5,406,790 A | * 4/1995 | Hirota et al. ............. | 60/276 |
| 5,412,946 A | * 5/1995 | Oshima et al. ........... | 60/286 |
| 5,441,401 A | * 8/1995 | Yamaguro et al. ........ | 431/4 |
| 5,921,076 A | * 7/1999 | Krutzsch et al. ......... | 60/274 |
| 5,974,791 A | * 11/1999 | Hirota et al. ............. | 60/276 |
| 6,047,543 A | * 4/2000 | Caren et al. .............. | 60/275 |
| 6,363,716 B1 | * 4/2002 | Balko et al. .............. | 60/286 |
| 6,560,958 B1 | * 5/2003 | Bromberg et al. ........ | 60/275 |

FOREIGN PATENT DOCUMENTS

| | | |
|---|---|---|
| DE | 298 17 756 U1 | 6/1999 |
| DE | 198 22 591 A1 | 11/1999 |
| DE | 199 39 807 A1 | 3/2001 |
| DE | 199 59 612 A1 | 6/2001 |
| EP | 1 211 394 A2 | 6/2002 |

OTHER PUBLICATIONS

German Search Report.

* cited by examiner

*Primary Examiner*—Thomas Denion
*Assistant Examiner*—Diem Tran
(74) *Attorney, Agent, or Firm*—Crowell & Moring LLP

(57) ABSTRACT

For the regeneration of an $NO_x$ storage catalyst by means of hydrogen in a secondary hydrogen process, the hydrogen required for the regeneration is taken from a primary hydrogen process.

4 Claims, 4 Drawing Sheets

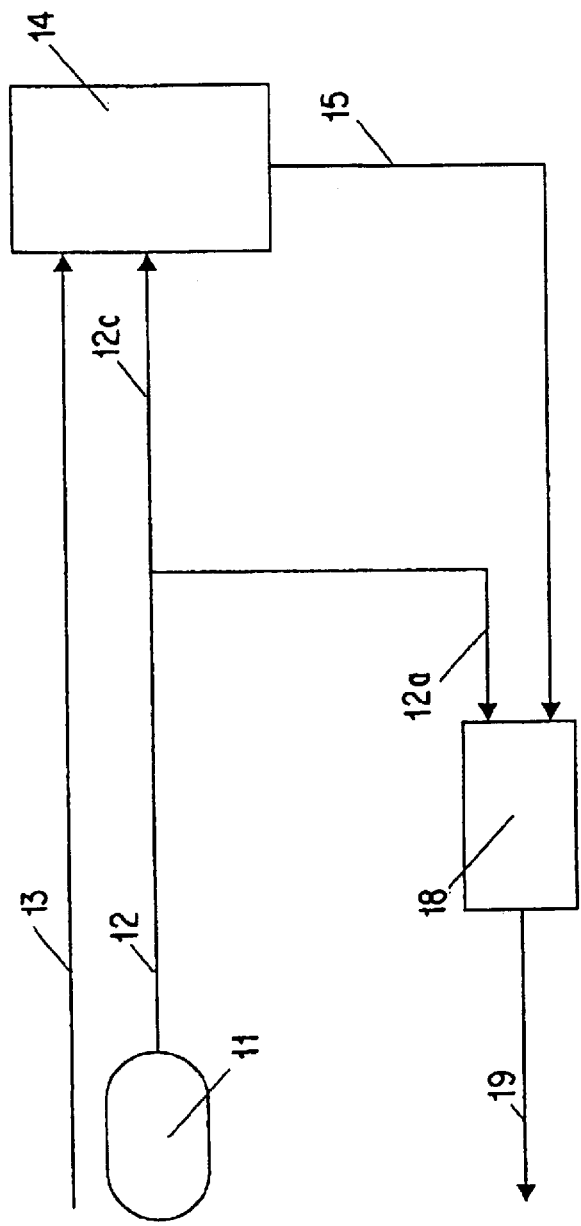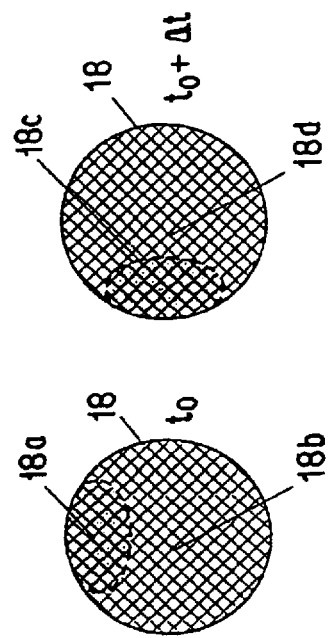

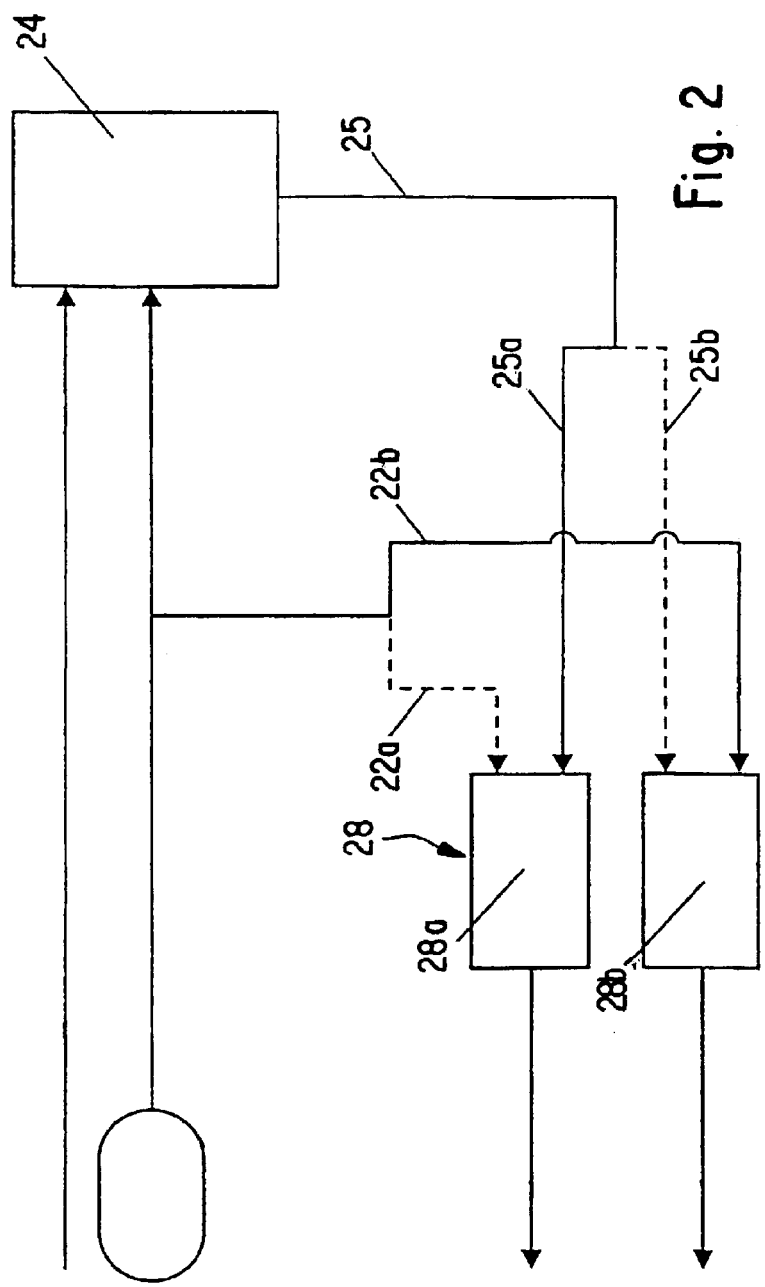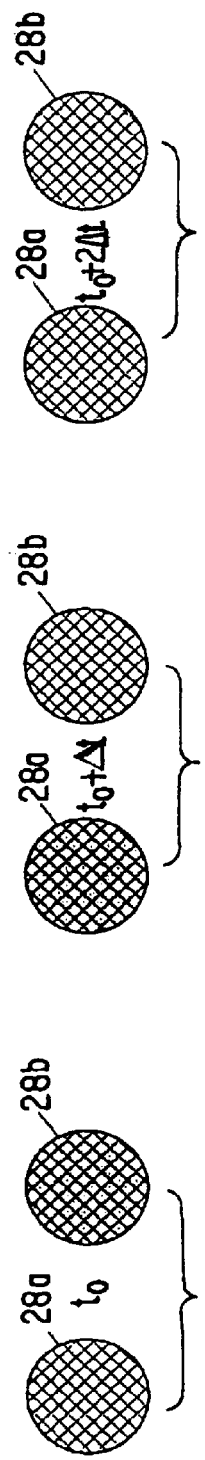

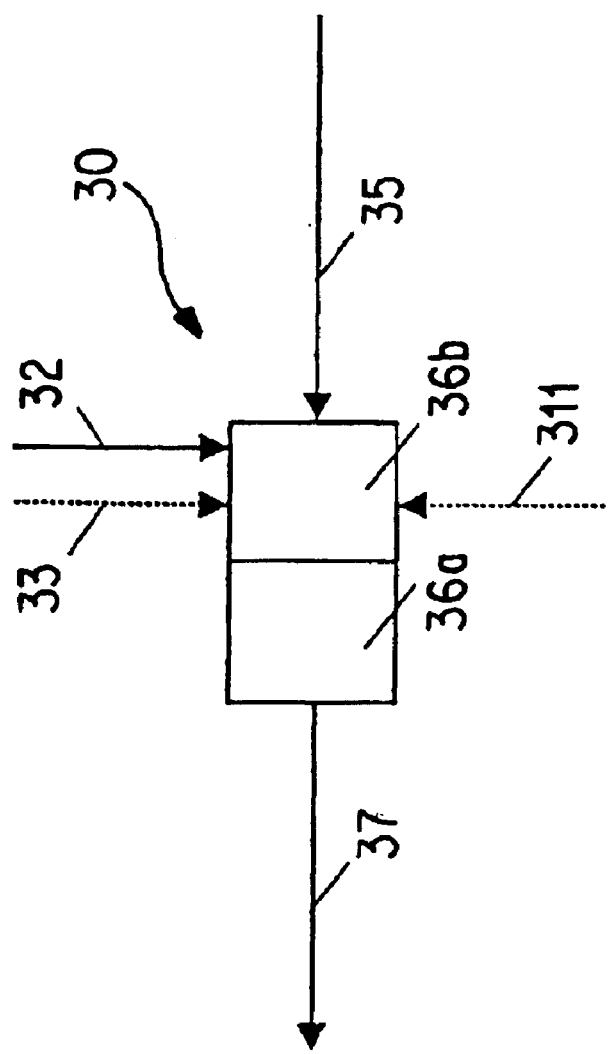

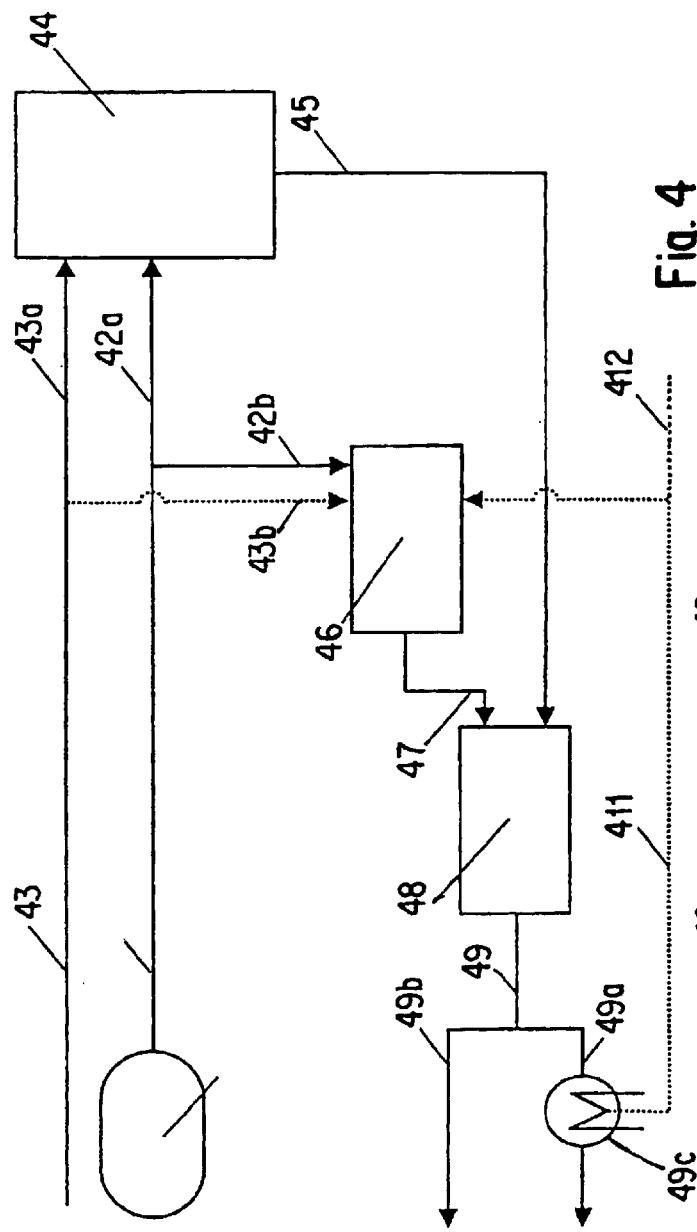

US 6,931,841 B2

PROCESS FOR THE CATALYTIC EXHAUST GAS AFTERTREATMENT OF ENGINE COMBUSTION EMISSIONS

This application claims the priority of German Patent Document No. 101 61 696.1, filed Dec. 15, 2001, the disclosure of which is expressly incorporated by reference herein.

BACKGROUND AND SUMMARY OF THE INVENTION

The invention relates to a process for the catalytic exhaust gas aftertreatment of engine combustion emissions by an $NO_x$ storage catalyst which can be regenerated by feeding hydrogen to the exhaust gas upstream of the $NO_x$ storage catalyst.

In the case of lean-operated internal-combustion engines, particularly in the case of direct-injection Otto engines, Diesel engines or hydrogen engines, which are operated at an overstoichiometric air-fuel ratio, it is necessary to reduce nitrogen oxides. In addition to continuously operating systems, intermittently operating $NO_x$ storage catalysts are used for this purpose which, in an overstoichiometric operation of the internal-combustion engine, intermediately store $NO_x$, which can be released again in shorter understoichiometric operating phases. For example, a platinum-containing adsorber is used which oxidizes NO by oxygen first to NO2. In the subsequent storage step, the acidic NO2 then attacks a metal oxide and in the process forms the pertaining nitrate. In particular, alkali metals and alkaline earth metals (such as barium) can be used as storage material and, because of their basic characteristics, are capable of forming sufficiently stable nitrates in the given temperature range. When the supply of storage oxides is used up, the engine must be operated for a short time by a rich mixture in order to regenerate the storage device. In this case, the reducing agents present in the rich mixture break up the nitrates and NO is created as well as the original metal oxide.

In the implementation of this concept, particularly the change from the lean to the rich operation required for the regeneration of the $NO_x$ adsorbent is disadvantageous. In addition to the very high control expenditures, there are also the risk of HC and CO slip as well as a particle/soot emission.

Remedies were provided by regenerating the $NO_x$ storage catalyst by adding hydrogen to the untreated exhaust gas upstream of the $NO_x$ storage catalyst. German Patent Document DE 199 39 807 A1 describes such a process and a system for the exhaust gas aftertreatment particularly for lean-mix engines, such as direct-injection Diesel engines and gasoline engines, as well as maintaining the operability of $NO_x$ storage catalysts in gasoline and diesel engines and particle filters in diesel engines. For the regeneration of the $NO_x$ storage catalyst, hydrogen is intermittently added to the untreated exhaust gas approximately once per minute in order to cause a reduction of the nitrogen oxides. According to German Patent Document DE 199 39 807 A1, a high-expenditure on-board hydrolysis unit is provided for obtaining the hydrogen, which hydrolysis unit, in addition to the actual electrolyzer, comprises a water reservoir, a metering device, a hydrogen reservoir for the intermediate storage and a piping system.

This unit requires the costs of a separate hydrogen process that includes the process-related devices required exclusively for the regeneration of the $NO_x$ storage catalyst. The hydrogen used for the regeneration of the $NO_x$ storage catalyst has to be made available only for the purpose of regenerating the catalyst and, if required, has to be intermediately stored in a hydrogen reservoir. The water reservoir has to be refilled regularly.

It is therefore an object of the invention to provide a process which overcomes the above-mentioned disadvantages.

According to the invention, this object is achieved by using a process which includes the withdrawal of the hydrogen used in a secondary process for the regeneration of the $NO_x$ storage catalyst from a primary hydrogen process.

Within the scope of the invention, the term "hydrogen" also applies to a hydrogen-rich synthesis gas.

In the case of a motor vehicle, whose internal-combustion engine can be operated with hydrogen, it is very expedient, if a partial quantity is extracted from the hydrogen flow fed to the internal-combustion engine and fed into the exhaust gas flow upstream of the $NO_x$ storage catalyst. Depending on the further design of the exhaust gas aftertreatment device, the feeding of the hydrogen to the exhaust gas flow takes place discretely or continuously.

In the case of a motor vehicle whose internal combustion engine is operated with hydrocarbon fuels and at which motor vehicle the hydrogen containing synthetic gas is produced in a primary hydrogen process by a reformer, especially in order to operate a fuel cell system, it is very advantageous, if a partial quantity of this hydrogen-rich reformer gas is fed into the exhaust gas flow upstream of the $NO_x$ storage catalyst.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic view of an example of the regeneration of an $NO_x$ storage catalyst comprising an adsorber part in the case of a motor vehicle whose internal-combustion engine can be operated with hydrogen;

FIG. 2 is a schematic view of an example of the regeneration of an $NO_x$ storage catalyst comprising two adsorber parts arranged in parallel in the case of a motor vehicle whose internal-combustion engine can be operated by hydrogen;

FIG. 3 is a schematic view of an example of the reaction processes taking place in a reformer system;

FIG. 4 is a schematic view of an example of the regeneration of an $NO_x$ storage catalyst by hydrogen in the case of a motor vehicle which comprises a reformer; and

DETAILED DESCRIPTION OF THE DRAWINGS

FIG. 1 describes the regeneration of an $NO_x$ storage catalyst for a motor vehicle whose internal-combustion engine can be operated with hydrogen in a primary hydrogen process. For the storage of the fuel, an insulated tank 11 is provided in which cryogenic hydrogen is stored in the liquid state at approximately −260° C. Through pipes 12, 12c, the hydrogen reaches the internal-combustion engine 14 and is converted there by air fed through the pipe 13. The nitrogen oxides, which are contained in the exhaust gas 15 of an overstoichiometric combustion during lean mix operations, are fed to a $No_x$ storage catalyst 18, and the cleaned exhaust gas is led away by pine 19.

A portion of the hydrogen fed to the internal-combustion engine 14 through the pipe 12 is extracted in a pipe 12a and is fed in the exhaust gas flow upstream the NO$_x$ storage catalyst 18 to a secondary hydrogen process for the purpose of regenerating the storage device. The hydrogen is stored in the tank 11 in the liquid state, while it reacts in the catalyst in the gaseous state. If the hydrogen is fed in a liquid state through insulated pipes 12, 12c to the internal-combustion engine 14, it is advantageous for the extracted hydrogen to be evaporated in the pipe 12a, so that it is added in the gaseous state to the exhaust gas flow 15 upstream the catalyst 18. The evaporation of the hydrogen can be achieved in that the pipe 12a is in a heat-exchanging contact with another pipe carrying a warmer medium. The pipe 12a extends, for example, in a spiral shape around another pipe or is surrounded by another pipe in a spiral shape. A further design with cooling ribs is also expedient for warming up the hydrogen with air.

In the adsorption mode the NO$_x$ storage catalyst cleans nitrogen oxides from the exhaust gas by first oxidizing NO by oxygen at the platinum of the catalyst to NO2, and subsequently the acidic NO2 corresponding to a storage adsorbs at metal oxide while forming the pertaining nitrate. With increasing degree of staturation of the NO$_x$ storage catalyst, the availability of storage oxides is depleting so that their regeneration is required. This is achieved by feeding hydrogen, and the hydrogen and the stored nitrogen oxides react according to the following equation into nitrogen and water:

$$H_2 + 1/x NO_{x\ ads} => 1/2 \times N_2 + H_2O \quad (1)$$

In this case, the controlling of the hydrogen feed takes place such that a regeneration occurs as a function of the loading condition of the catalyst. A high loading of the NO$_x$ storage catalyst necessitates a high hydrogen addition to the untreated exhaust gas. When the loading decreases, the hydrogen feed is correspondingly discretely or continuously reduced and vice-versa.

FIG. 1 illustrates an embodiment in which the NO$_x$ storage catalyst comprises an adsorber part 18 which, in different sections, can be operated alternately in the adsorption or the desorption mode. For this purpose, the hydrogen is fed, preferably continuously, to the exhaust gas flow upstream the NO$_x$ storage catalyst 18 so that sections which change successively with respect to time are regenerated by hydrogen. As a result of the treatment of all of these sections, the regeneration of the entire storage catalyst 18 takes place. For example, at a point in time $t_0$, a section 18a is regenerated by hydrogen and, at a point in time ($t_0+\Delta t$), a section 18c is regenerated by hydrogen. While the sections 18b, 18d continue to adsorb NO$_x$ at the corresponding point in time. For the admission of hydrogen to partial areas 18a, 18c of the cross-section 18, for example, a covering element is used which can be rotated relative to the catalyst body and which divides the circular absorber part 18 into sectors and, with which, the added hydrogen can be directed to certain areas. According to another embodiment, the injection nozzle for feeding the hydrogen can be moved so that a targeted supply takes place.

FIG. 2 shows an alternative further embodiment comprising an NO$_x$ storage catalyst which has two adsorber parts 28a, 28b arranged in parallel. The exhaust gas flow, which contains nitrogen oxides and is discharged through the pipe 25 from the internal-combustion engine 24, can be conducted through the pipes 25a, 25b through the adsorber part 28a and/or through the adsorber part 28b; hydrogen can be fed through the pipes 22a, 22b to the exhaust gas flow upstream the catalyst 28.

As a result of the operations of the adsorber parts 28a, 28b which change successively with respect to time, in the adsorption or desorption, mode a regeneration of one adsorber part can take place in each case, while the other continues to be available for the cleaning of the exhaust gas. Thus, at the point in time t0, the adsorber part 28b is regenerated by the feeding of hydrogen by way of the pipe 22b, which is illustrated as a solid line, to the untreated exhaust gas, while the adsorber part 28a continues to adsorb nitrogen oxides from the exhaust gas fed by way of the pipe 25a illustrated as solid line 25a. At a subsequent point in time $t_0+\Delta t$, the adsorber part 28a is regenerated by hydrogen by way of the pipe 22a illustrated by a broken line so that its regeneration takes place, while the adsorber part 28b adsorbs nitrogen oxides from the exhaust gas. Subsequently, at a point in time $t_0+2\ \Delta t$, both adsorber parts 28a, 28b are regenerated and are then available for cleaning the exhaust gas.

Furthermore, it is very expedient to use the process according to the invention in the case of a motor vehicle which, in a primary hydrogen process, comprises a fuel cell and which, for supplying the latter with hydrogen, comprises a reformer, as illustrated, for example, in FIG. 3. The internal-combustion engine of the motor vehicle is expediently operated by hydrocarbon which is also available to the reformer for producing a hydrogen-rich synthesis gas. Corresponding to the respective type of reforming, hydrocarbon-containing fuel 32 is reacted in the reformer 30 in a reaction zone 36b by the addition of air 33 and/or water 311 to a reformate including predominantly H2, CO and N2.

An emission control device of a motor vehicle of this type is illustrated in FIG. 4. A hydrocarbon-containing fuel, such as gasoline or Diesel fuel, is stored in a tank 41, which fuel is fed to an internal-combustion engine 44 by way of pipes 42, 42a. The exhaust gas, which is generated during the combustion with air fed by way of the pipes 43, 43a and which contains nitrogen oxides in the lean-mix operation, is fed to an NO$_x$ storage catalyst 48 by way of the pipe 45 for cleaning, which NO$_x$ storage catalyst is regenerated in that alternately sections 48a, 48c are treated by hydrogen, while sections 48b, 48d continue to be available for the cleaning of the exhaust gas. The adsorption and desorption operations continue to correspond to those shown in FIG. 1.

The hydrogen required in a secondary hydrogen process for the regeneration of the NO$_x$ storage catalyst 48 according to Equation (1) is partially extracted from the reformate provided to a fuel cell which is not shown in this Figure. For producing the hydrogen, hydrocarbon-containing fuel is fed to the reformer 46 by way of the pipe 42b, as well as air and/or water is/are fed by way of the pipes 43b, 411, 412; by way of pipe 47, the reformate is added to the exhaust gas flow upstream the NO$_x$ storage catalyst 48 for the purpose of regeneration. The cleaned exhaust gas is led away by way of a pipe 49, 49b, in which case it is very expedient to conduct at least a partial flow by way of a pipe 49a, for the purpose of recovering water through a condenser 49c. Also in this embodiment, naturally—as illustrated and described by FIG. 2—an NO$_x$ storage catalyst 48 can be used which has two adsorber parts.

What is claimed:

1. A process for catalytic exhaust gas aftertreatment of engine combustion emissions with an NO$_x$ storage catalyst which can be regenerated by feeding hydrogen to the exhaust gas upstream of the NO$_x$ storage catalyst, the process comprising:

feeding the hydrogen used in a secondary process for the regeneration and desorption of the NO$_x$ storage catalyst or adsorber catalyst from a primary hydrogen process;

in the case of a motor vehicle whose internal-combustion engine is operated in a primary hydrogen process with only hydrogen, extracting a partial quantity of hydrogen from the hydrogen flow supplied to the internal-combustion engine and feeding the partial quantity to the exhaust gas flow upstream of the $NO_x$ storage catalyst; and downstream of the $NO_x$ storage catalyst, condensing water vapor contained in the exhaust gas and feeding it to a hydrogen process.

2. A process for catalytic exhaust gas aftertreatment of engine combustion emissions with an $NO_x$ storage catalyst which can be regenerated by feeding hydrogen to the exhaust gas upstream of the $NO_x$ storage catalyst, the process comprising:

feeding the hydrogen used in a secondary process for the regeneration and desorption of the $NO_x$ storage catalyst or adsorber catalyst from a primary hydrogen process;

in the case of a motor vehicle whose internal-combustion engine is operated in a primary hydrogen process with only hydrogen, extracting a partial quantity of hydrogen from the hydrogen flow supplied to the internal-combustion engine and feeding the partial quantity to the exhaust gas flow upstream of the $NO_x$ storage catalyst; and regenerating different sections of an adsorber material of the $NO_x$ storage catalyst in a successive manner with respect to time.

3. An engine exhaust system comprising:

an $NO_x$ storage catalyst which is regenerable by feeding hydrogen to the exhaust gas upstream of the $NO_x$ storage catalyst, wherein hydrogen is fed from a primary hydrogen process to a secondary process for the regeneration and desorption of the $NO_x$ storage catalyst or adsorber catalyst, wherein, in the case of a motor vehicle whose internal-combustion engine is operated in a primary hydrogen process with only hydrogen, a partial quantity of hydrogen is extracted from the hydrogen flow supplied to the internal-combustion engine and fed to the exhaust gas flow upstream of the $NO_x$ storage catalyst, wherein, downstream of the $NO_x$ storage catalyst, water vapor contained in the exhaust gas is condensed and fed to a hydrogen production process.

4. An engine exhaust system comprising:

an $NO_x$ storage catalyst which is regenerable by feeding hydrogen to the exhaust gas upstream of the $NO_x$ storage catalyst, wherein hydrogen is fed from a primary hydrogen process to a secondary process for the regeneration and desorption of the $NO_x$ storage catalyst or adsorber catalyst, wherein, in the case of a motor vehicle whose internal-combustion engine is operated in a primary hydrogen process with only hydrogen, a partial quantity of hydrogen is extracted from the hydrogen flow supplied to the internal-combustion engine and fed to the exhaust gas flow upstream of the $NO_x$ storage catalyst, wherein the $NO_x$ storage catalyst includes an adsorber material being regenerated section-wise in a successive manner with respect to time.

* * * * *